United States Patent
Mao et al.

(10) Patent No.: US 12,019,146 B2
(45) Date of Patent: Jun. 25, 2024

(54) ACCURATE GRID LOCKING METHOD FOR TARGET COMPOSITE TRACKING SYSTEM IN TERMINAL AREA

(71) Applicant: THE 28TH RESEARCH INSTITUTE OF CHINA ELECTRONICS TECHNOLOGY GROUP CORPORATION, Nanjing (CN)

(72) Inventors: Yi Mao, Nanjing (CN); Rui Sun, Nanjing (CN); Xiaowen Wang, Nanjing (CN); Yi Yang, Nanjing (CN); Yang Ding, Nanjing (CN); Jiajing Zhang, Nanjing (CN); Shangwen Yang, Nanjing (CN)

(73) Assignee: THE 28TH RESEARCH INSTITUTE OF CHINA ELECTRONICS TECHNOLOGY GROUP CORPORATION, Nanjing (CN)

( * ) Notice: Subject to any disclaimer, the term of this patent is extended or adjusted under 35 U.S.C. 154(b) by 472 days.

(21) Appl. No.: 17/443,010

(22) Filed: Jul. 19, 2021

(65) Prior Publication Data
US 2023/0152438 A1    May 18, 2023

(51) Int. Cl.
*G01S 13/72* (2006.01)
*G01S 7/00* (2006.01)
*G01S 13/87* (2006.01)

(52) U.S. Cl.
CPC ............ *G01S 13/723* (2013.01); *G01S 7/003* (2013.01); *G01S 13/87* (2013.01)

(58) Field of Classification Search
CPC ......... G01S 13/723; G01S 7/003; G01S 13/87
See application file for complete search history.

(56) References Cited

U.S. PATENT DOCUMENTS

| 7,672,801 B1 * | 3/2010 | Sczaniecki | ............ G01S 5/0289 702/95 |
| 10,054,939 B1 * | 8/2018 | Applewhite | ......... G08G 5/0008 |

(Continued)

FOREIGN PATENT DOCUMENTS

| CA | 3108375 A1 | * | 3/2020 | ............ G01S 13/781 |
| CN | 109100698 A | * | 12/2018 | ............ G01S 13/726 |
| WO | WO-2020113062 A1 | * | 6/2020 | ............ B64C 39/024 |

OTHER PUBLICATIONS

Miller et al. "Battle Group Gridlock Demonstration," Johns Hopkins A PL Technical Digest, vol. 2, No. 4, 1981, all pages (Year: 1981).*

(Continued)

*Primary Examiner* — Vladimir Magloire
*Assistant Examiner* — Samarina Makhdoom
(74) *Attorney, Agent, or Firm* — CBM PATENT CONSULTING, LLC

(57) ABSTRACT

An accurate grid locking method for a target composite tracking system in a terminal area comprises a cooperative engagement processer in each platform which performs for arranging a radar data storage structure, storing the target plot data received by the cooperative engagement processer in the corresponding radar data storage structure one by one, processing target plot data of a previous sector to form a target track, distributing the obtained target track to another platform on a data link, and receiving track data of a remote target distributed by another platform, inputting the track data into the plot data storage structure of the platform.

6 Claims, 4 Drawing Sheets

(56) References Cited

U.S. PATENT DOCUMENTS

| | | | | |
|---|---|---|---|---|
| 10,473,789 | B1* | 11/2019 | Day | G01S 19/51 |
| 2007/0247353 | A1* | 10/2007 | Budic | G01S 13/5244 |
| | | | | 342/21 |
| 2019/0019423 | A1* | 1/2019 | Choi | G05D 1/0088 |
| 2020/0218913 | A1* | 7/2020 | Unnikrishnan | G01S 13/867 |

OTHER PUBLICATIONS

Miller et al. "Battle Group Gridlock—An Update", Johns Hopkins APL Technical Digest, vol. 11, Numbers 1 and 2 (1990), all pages (Year: 1990).*

* cited by examiner

|  | Azimuth sector 1 | Azimuth sector 2 | Azimuth sector M |
|---|---|---|---|
| Plot file | $p \equiv (x_m, y_m, t)$ | | ... |
| Track file | $T \equiv (\hat{x}, \hat{y}, \hat{t}, \alpha, \beta)$ | | ... |

FIG. 2

ACCURATE GRID LOCKING METHOD FOR TARGET COMPOSITE TRACKING SYSTEM IN TERMINAL AREA

TECHNICAL FIELD

The present invention relates to the field of Intelligence, Surveillance, and Reconnaissance (ISR) technologies, and more particularly, to a radar and data link composite tracking technology

BACKGROUND

With the rapid development of the Internet of Things, there will be end-to-end distributed information processing technology requirements in many fields, and composite tracking is one of them. Composite tracking is mainly used for a large system without central nodes based on data links between terminal area movement platforms, such as aircraft, ships, ground vehicles and other terminal area movement platforms, and each platform in the system is equipped with a Cooperative Engagement Processor (CEP). The CEP processes radar data distributed on various platforms in a distributed manner to form a Single Integrated Picture (SIP), which solves the problem of accurate sharing of target situations on multiple platforms and supports coordinated actions in delay sensitive occasions.

Technologies related to composite tracking in the prior art comprise: (1) distributed track fusion, in which multiple aircraft exchange target track information according to reporting responsibility based on a data link; the target track is non-plot, and the target situations are unified through track selection and unified batch processing, which are configured for sharing Common Tactical Picture (CTP) of all members in a data link network; because track information isolates a radar to scan azimuths in real time, the distributed track fusion cannot be used for accurate grid locking, and the accuracy and real-time performance of the CTP generated is much lower than that of the SIP; and (2) centralized plot fusion processing, wherein each aircraft in the terminal area gathers target plot data of a radar to the same central node for processing; because the centralized processing cannot be synchronized with the radar scanning of each aircraft in the terminal area, it is impossible to realize accurate grid locking, and it is impossible to produce a target locking effect according to the fusion track. (3) There are no specific concept, function, principle and implementation method of accurate grid locking mentioned in relevant literatures.

SUMMARY

Objectives of the present invention: A technical problem to be solved by the present invention is to provide an accurate grid locking method for a target composite tracking system in a terminal area aiming at the shortcomings of the prior art which lack "distributed plot composite tracking". By accurately mapping a remote radar target and a radar data storage structure of the platform, and synchronously processing remote radar data and radar scanning of the platform, a problem that multiple platforms produce a single integrated picture with high precision and low delays under the condition of no central node is solved, and the accurate situation sharing of multiple platforms is realized.

The technical solutions of the present invention are as follows:

An accurate grid locking method for a target composite tracking system in a terminal area performs accurate grid locking for a target composite tracking system composed of a cooperative engagement processer in each platform, comprising:

step 1: arranging a radar data storage structure through software design of the cooperative engagement processer, wherein the radar data storage structure comprises a plot data storage structure and a track data storage structure;

step 2: as a radar scans according to the azimuth, storing the target plot data received by the cooperative engagement processer in the corresponding radar plot data storage structure one by one;

step 3: when the radar finishes scanning each sector, processing target plot data of a previous sector to form a target track;

step 4: distributing the obtained target track to another platform on a data link; and step 5: receiving track data of a remote target distributed by another platform, inserting the track data into the plot data storage structure of the platform according to the azimuth, and executing step 3.

Further, in one implementation, the step 1 comprises:

dividing a coverage airspace of the radar into M azimuth sectors centering on the radar through the cooperative engagement processer, wherein M is a number of equal parts of 360°, and a sector angle of each azimuth sector is 360°/M; and establishing two types of radar data storage structures according to the azimuth sectors, wherein the two types of radar data storage structures are the plot data storage structure and the track data storage structure;

wherein, the plot data storage structure is corresponding to plot sectors and configured for storing the received target plot data, and the track data storage structure is corresponding to track sectors and configured for storing the track data obtained by the cooperative engagement processer by processing the target plot data;

ranges of the plot sectors and the track sectors are consistent, or the ranges of the plot sectors and the track sectors are offset by half of the azimuth sector; and the plot sectors are arranged in an order of plot detection time; and the track sectors are arranged according to an increasing order of track azimuth.

Further, in one implementation, the step 2 comprises:

receiving, by the cooperative engagement processer, target plot data of the platform in real time;

taking a radar position obtained by a navigation system of the platform in real time as a coordinate center, which is, an origin of polar coordinates, performing projection error correction and data registration on the target; wherein, the projection error correction means converting a spatial position of the target plot data into error correction of a ground projection position, and the data registration means performing systematic error correction on the target plot data and track data of a remote target; and consolidating the received target plot data into a plot file format, and storing the plot file format in a plot sector corresponding to a target azimuth.

Further, in one implementation, the step 3 comprises:

when the radar scans an azimuth where a sector ends, performing association processing, by the cooperative engagement processer, on target information in the previous sector and the target track in a track sector; the target information comprising the received target plot data of the platform and the target plot data of the plot file format converted by the track data of the remote target obtained in the step 5; and the target track being track information generated by processing the target plot data of the previous sector; and the association processing comprising space-time unifying, batch number unifying and correlation solving;

wherein, the space-time unifying refers to a method of unifying clocks, unifying coordinate systems and unifying coordinate conversion of each platform; the batch number unifying refers to unifying a radar target identification number of each platform; and the correlation solving refers to associating the existing target track with the latest target plot data, generating a track update file and sending the track update file to a client system for target monitoring, and meanwhile, predicting a position of the target track in next cycle, and storing the target azimuth of the predicted position in the corresponding track sector to prepare for association processing between next scanning cycle and the target plot data; and with the 0° to 360° continuous scanning of the radar, the association processing goes through every sector and goes round and round to form a single integrated picture for target tracking.

Further, in one implementation, the step 4 comprises:

converting, by the cooperative engagement processor, a current position of the target track into geographic coordinates expressed by longitude and latitude to form a formatted message;

sending the formatted message to a cooperative engagement processor of another platform on the data link in real time through a data link transmission device; and in the process of converting the current position of the target track into the geographic coordinates expressed by latitude and longitude, setting an origin of the geographic coordinates as (0°,0°), which is used to avoid additional target position errors due to coordinate conversion residuals when taking the longitude and latitude of the platform as the origin.

Further, in one implementation, the step 5 comprises:

step 5-1: when the cooperative engagement processor receives the track data of the remote target distributed by another platform, sending the track data of the remote target to a client system to display a single integrated picture to ensure a low delay;

step 5-2: converting to a coordinate system centered on a radar position of the platform, registering remote data, storing the remote data in the corresponding plot sector according to an azimuth of the remote target, and reserving track information in the stored plot file for space-time unifying, batch number unifying and correlation solving in the step 3; the reserved track information comprising batch number, heading, speed and time; and step 5-3: executing the operation of the step 3.

Further, in one implementation, the target composite tracking system composed of the cooperative engagement processor in the platform comprises:

the cooperative engagement processor deployed on each platform, and distributed processing software and interface software corresponding to the cooperative engagement processor;

the cooperative engagement processor is a generic device, and the cooperative engagement processor interfaces with the radar of the platform for receiving the target plot data; the cooperative engagement processor interfaces with a data link transmission device for exchanging information with the cooperative engagement processor of another platform on the data link to obtain a remote track; and the cooperative engagement processor interfaces with a task system of the platform, and sends a generated composite track to a client system to display a single integrated picture; and a scale of the composite tracking system is related to task requirements; and when a data link transmission device is additionally installed on a relevant platform in advance, one cooperative engagement processor is deployed at the same time for organization and application temporarily according to the task requirements.

The main advantages of the present invention are as follows:

The cooperative engagement processor of each platform executes the same program, which can accurately combine the independent radars of each platform into a "big radar", and solve the problem that members on the data link share the single integrated picture without a central node;

the remote radar target is transformed into the tracking effect of the platform, and even if the radar of the platform is in a silent state, that is, the radar of the platform only scans but does not radiate, the target can be locked and the target situation can be shared; and composite tracking processing is synchronized with the radar scanning of the platform, and the target tracking delay is minimal, which is beneficial to accurate control.

BRIEF DESCRIPTION OF THE DRAWINGS

In order to illustrate the technical solutions of the present invention more clearly, the drawings needed to be used in the embodiments of the present invention will be briefly described below. Obviously, those having ordinary skills can also obtain other drawings according to these drawings without going through any creative work.

FIG. 2 is a schematic diagram of track and track file compiling of a CEP in the accurate grid locking method for the target composite tracking system in the terminal area provided by the embodiments of the present invention;

DETAILED DESCRIPTION

Figure 1:
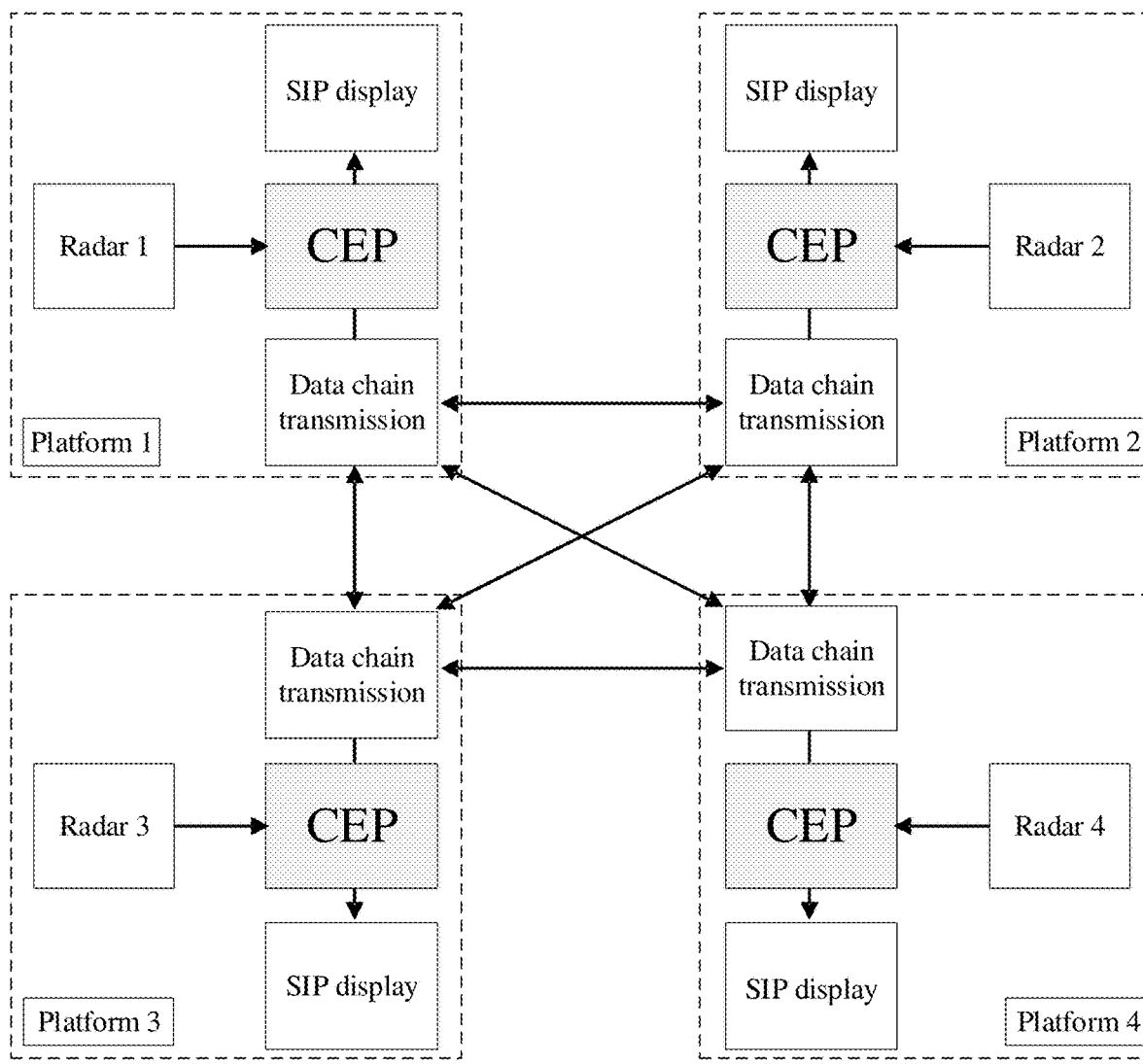
FIG. 1 is a schematic diagram of a system architecture in an accurate grid locking method for a target composite tracking system in a terminal area provided by the embodiments of the present invention.

In order to make the above objectives, features and advantages of the present invention be more clearly understood, the present invention will be described in further detail below with reference to the drawings and detailed description.

The embodiments of the present invention disclose an accurate grid locking method for a target composite tracking system in a terminal area. The method may be applied to various mobile platforms comprising ground, air or water surface, forms an action community based on a data link network, and solves the problems of cooperative reconnaissance and accurate situation sharing under the condition of no center through monitoring information exchange and end-to-end distributed processing. Based on situation sharing, a wide range of flexible collaborative applications can be generated.

The accurate grid locking method for the target composite tracking system in the terminal area according this embodiment performs accurate grid locking for a target composite tracking system composed of a cooperative engagement processer in each platform, comprising:

step 1: arranging a radar data storage structure through software design of the cooperative engagement processer, wherein the radar data storage structure comprises a plot data storage structure and a track data storage structure;

step 2: as a radar scans according to the azimuth, storing the target plot data received by the cooperative engagement processor in the corresponding radar data storage structure one by one; wherein, in this embodiment, through this step, a target plot data grid is stored according to the radar data storage structure;

step 3: when the radar finishes scanning each sector, processing target plot data of a previous sector to form a target track; wherein, in this embodiment, the target plot data is processed synchronously through this step, and every sector scanned by the radar is processed by the cooperative engagement processor once, that is, the processing of the cooperative engagement processor is synchronized with radar scanning, and the delay is minimized;

step 4: distributing the obtained target track to another platform on a data link; wherein, in this embodiment, the target information is exchanged through this step for multi-platform distributed cooperative processing; and step 5: receiving track data of a remote target distributed by another platform, inserting the track data into the plot data storage structure of the platform, and executing the step 3. Through this step, the remote target is inserted into the plot grid.

The present invention discloses the accurate grid locking method for the target composite tracking system in the terminal area, which relates to the radar and data link composite tracking and monitoring technology. With the rapid development of the Internet of Things, there will be end-to-end distributed information processing technology requirements in many fields, and composite tracking is one of them. Composite tracking is mainly used for a large system without central nodes based on data links between terminal area movement platforms, such as aircraft, ships, ground vehicles and other terminal area movement platforms, and each platform in the system is equipped with a cooperative engagement processor. The cooperative engagement processor processes radar data distributed on various platforms in a distributed manner to form a single integrated picture, which solves the problem of accurate sharing of target situations on multiple platforms and supports coordinated actions in delay sensitive occasions. If the data structure, remote track arrangement, information precision control and synchronous/asynchronous processing methods of the cooperative engagement processers of each platform are different, the track precisions and delays of the single integrated pictures will be completely different, and even the conditions for achieving cooperative monitoring between the platforms will be affected. Therefore, the accurate grid locking method for the target composite tracking system in the terminal area is proposed, which is intended to realize high precision and low delay of composite track tracking and support coordinated actions in delay sensitive occasions by accurately mapping the remote radar data with the radar data storage structure of the platform and synchronously processing the remote radar data with the radar scanning of the platform.

In the accurate grid locking method for the target composite tracking system in the terminal area according to this embodiment, the step 1 comprises:

dividing a coverage airspace of the radar into M azimuth sectors centering on the radar through the cooperative engagement processor, wherein M is a number of equal parts of 360°, and a sector angle of each azimuth sector is 360°/M. In this embodiment, through software design of the CEP, the coverage airspace of the radar is divided into M azimuth sectors centering on the radar, where M is the number of equal parts of 360°, and the sector angle of each azimuth sector is 360°/M, and M may be 16, 32 and 64, depending on processing delay requirements of the CEP.

Figure 3:
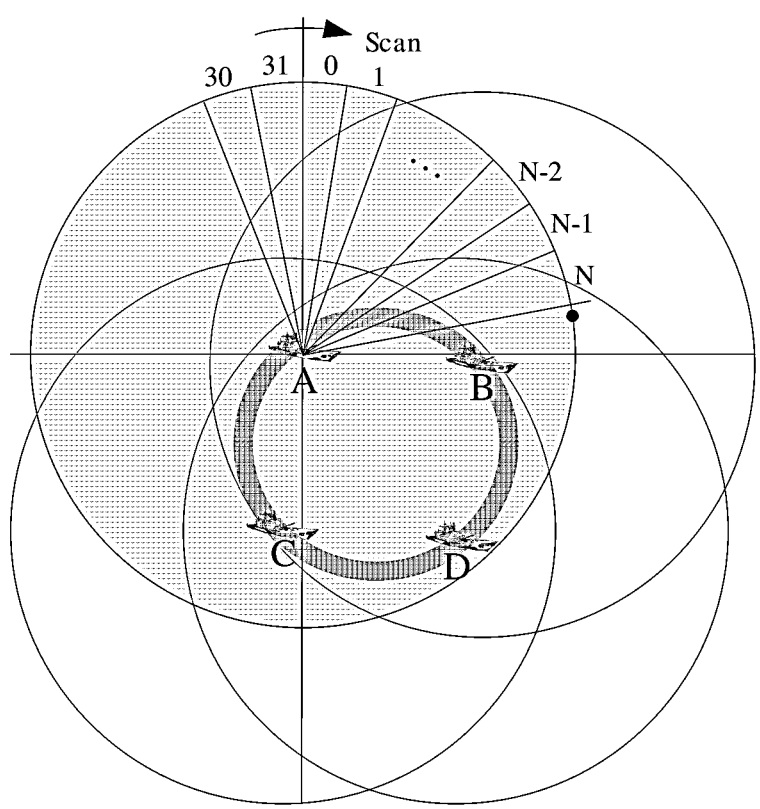
FIG. 3 is a schematic diagram of radar coverage and sector division of the terminal area in the accurate grid locking method for the target composite tracking system in the terminal area provided by the embodiments of the present invention.

In this embodiment, M=32; in this case, sector 0 is 0° to 11.25°, sector 1 is 11.25° to 22.5°, . . . , and sector 31 is 348.75° to 360°, as shown in FIG. 3.

Establishing two types of radar data storage structures according to the azimuth sectors, wherein the two types of radar data storage structures are the plot data storage structure and the track data storage structure;

wherein, the plot data storage structure is corresponding to plot sectors and configured for storing the received target plot data, and the track data storage structure is corresponding to track sectors and configured for storing the track data obtained by the cooperative engagement processor by processing the target plot data;

ranges of the plot sectors and the track sectors are consistent, or the ranges of the plot sectors and the track sectors are offset by half of the azimuth sector; and the plot sectors are arranged in an order of plot detection time; and the track sectors are arranged according to an increasing order of track azimuth.

In the accurate grid locking method for the target composite tracking system in the terminal area according to this embodiment, the step 2 comprises:

receiving, by the cooperative engagement processor, target plot data of the platform in real time;

taking a radar position obtained by a navigation system of the platform in real time as a coordinate center, which is, an origin of polar coordinates, performing projection error correction and data registration on the target; wherein, the projection error correction means converting a spatial position of the target plot data into error correction of a ground projection position, and the data registration means performing systematic error correction on the target plot data and track data of a remote target; and consolidating the received target plot data into a plot file format, and storing the plot file format in a plot sector corresponding to a target azimuth.

In the accurate grid locking method for the target composite tracking system in the terminal area according to this embodiment, the step 3 comprises:

when the radar scans an azimuth where a sector ends, performing association processing, by the cooperative engagement processor, on target information in the previous sector and the target track in a track sector; the target information comprising the received target plot data of the platform and the target plot data of the plot file format converted by the track data of the remote target obtained in the step 5; and the target track being track information generated by processing the target plot data of the previous sector; wherein, in this embodiment, it is one cycle when the radar scans from 0° to 360°, comprising M sectors. For example, if the scanning period of the radar is 4 seconds, and M=32, the scanning time for each sector is 0.125 seconds.

The association processing comprises space-time unifying, batch number unifying and correlation solving;

wherein, the space-time unifying refers to a method of unifying clocks, unifying coordinate systems and unifying coordinate conversion of each platform, so as to align a plot time of the associated processing moment; the batch number unifying refers to unifying a radar target identification number of each platform; and the correlation solving refers to associating the existing target track with the latest target plot data, generating a track update file and sending the track update file to a client system for target monitoring, and meanwhile, predicting a position of the target track in next cycle, and storing the target azimuth of the predicted position in the corresponding track sector to prepare for association processing between next scanning cycle and the target plot data; and with the 0° to 360° continuous scanning of the radar, the association processing goes through every sector and goes round and round to form a single integrated picture for target tracking.

In the accurate grid locking method for the target composite tracking system in the terminal area according to this embodiment, the step 4 comprises:

converting, by the cooperative engagement processer, a current position of the target track into geographic coordinates expressed by longitude and latitude to form a formatted message;

sending the formatted message to a cooperative engagement processer of another platform on the data link in real time through a data link transmission device; and in the process of converting the current position of the target track into the geographic coordinates expressed by latitude and longitude, setting an origin of the geographic coordinates as (0°,0°), which is used to avoid additional target position errors due to coordinate conversion residuals when taking the longitude and latitude of the platform as the origin.

In the accurate grid locking method for the target composite tracking system in the terminal area according to this embodiment, the step 5 comprises:

step 5-1: when the cooperative engagement processer receives the track data of the remote target distributed by another platform, sending the track data of the remote target to a client system to display a single integrated picture to ensure a low delay;

step 5-2: converting to a coordinate system centered on a radar position of the platform, registering remote data, storing the remote data in the corresponding plot sector according to an azimuth of the remote target, and reserving track information in the stored plot file for space-time unifying, batch number unifying and correlation solving in the step 3; the reserved track information comprising batch number, heading, speed and time; and step 5-3: executing the operation of the step 3.

In the accurate grid locking method for the target composite tracking system in the terminal area according to this embodiment, the target composite tracking system composed of the cooperative engagement processer in the platform comprises:

the cooperative engagement processer deployed on each platform, and distributed processing software and interface software corresponding to the cooperative engagement processer;

the cooperative engagement processer is a generic device, and the cooperative engagement processer interfaces with the radar of the platform for receiving the target plot data; the cooperative engagement processer interfaces with a data link transmission device for exchanging information with the cooperative engagement processer of another platform on the data link to obtain a remote track; and the cooperative engagement processer interfaces with a task system of the platform, and sends a generated composite track to a client system to display a single integrated picture; and a scale of the composite tracking system is related to task requirements; and when a data link transmission device is additionally installed on a relevant platform in advance, one cooperative engagement processer is deployed at the same time for organization and application temporarily according to the task requirements.

Taking FIG. 1 as an example, four platforms (A, B, C and D) are provided to form an action community operating in the terminal area, such as a formation. The coverage airspace of the radar on each platform is divided into M azimuth sectors (M=32), and the CEP of each platform establishes corresponding plot storage areas and track storage areas for 32 sectors, wherein the area number N=0, 1, 2, ..., and 31, as shown in FIG. 2. The four platforms in the system structure in FIG. 1 are only schematic, and the specific number of nodes is determined by the task requirements.

Taking the platform A as an example, as the radar scans, the CEP continuously receives the target plot data, performs the projection error correction and data register, and then consolidates the data into the plot file format, and stores the plot file format in the plot sector corresponding to the target azimuth. For example, if a target azimuth angle is α, the plot file format is stored in an $$\left[\frac{\alpha}{32}\right]\text{-th}$$

storage area. Because the radar scanning is continuous in azimuths, the target plot data is stored in a time sequence.

When the radar scans an azimuth where an N-th sector ends, the CEP takes plots in {N,(N−1),(N−2)} sectors for time alignment processing, then takes tracks of an (N−1)-th sector and these plots for space-time unifying, batch number unifying and correlation solving to generate a target track update file, which is stored in the corresponding track storage area according to the target azimuth; when scanning an azimuth wherein next (N+1)-th section ends, the same processing is repeated for the (N+1)-th sector. As the radar scans, the processing goes through each sector, and goes round and round and iterates continuously to obtain a target motion track, wherein the target motion track is the track.

The CEPs of the four platforms perform the same operation in parallel, and convert the track information possessed respectively into longitude and latitude coordinates and send the longitude and latitude coordinates to CEPs of another platform in the network in real time. In coordinate conversion, a geographical coordinate reference point should be set as (0°,0°) to avoid additional target position errors due to coordinate conversion residuals caused by taking longitude and latitude of an aircraft as a reference.

Still taking the platform A as an example, the CEP receives the target track information of the remote radar, which is first displayed to ensure low delay, then converted to a coordinate system centered on the radar position of the platform A, then the remote data is registered, and inserted into the plot storage area of the CEP according to the target azimuth, for example, if the target azimuth is a, the data is inserted into the $$\left[\frac{\alpha}{32}\right]\text{-th}$$

storage area, and when the radar of the platform scans the sector, the data is subjected to plot composite processing with the radar of the platform to ensure high accuracy. Track information comprising "batch number, heading, speed and time" is reserved in the plot file for time aligning and batch number unifying.

Figure 4:
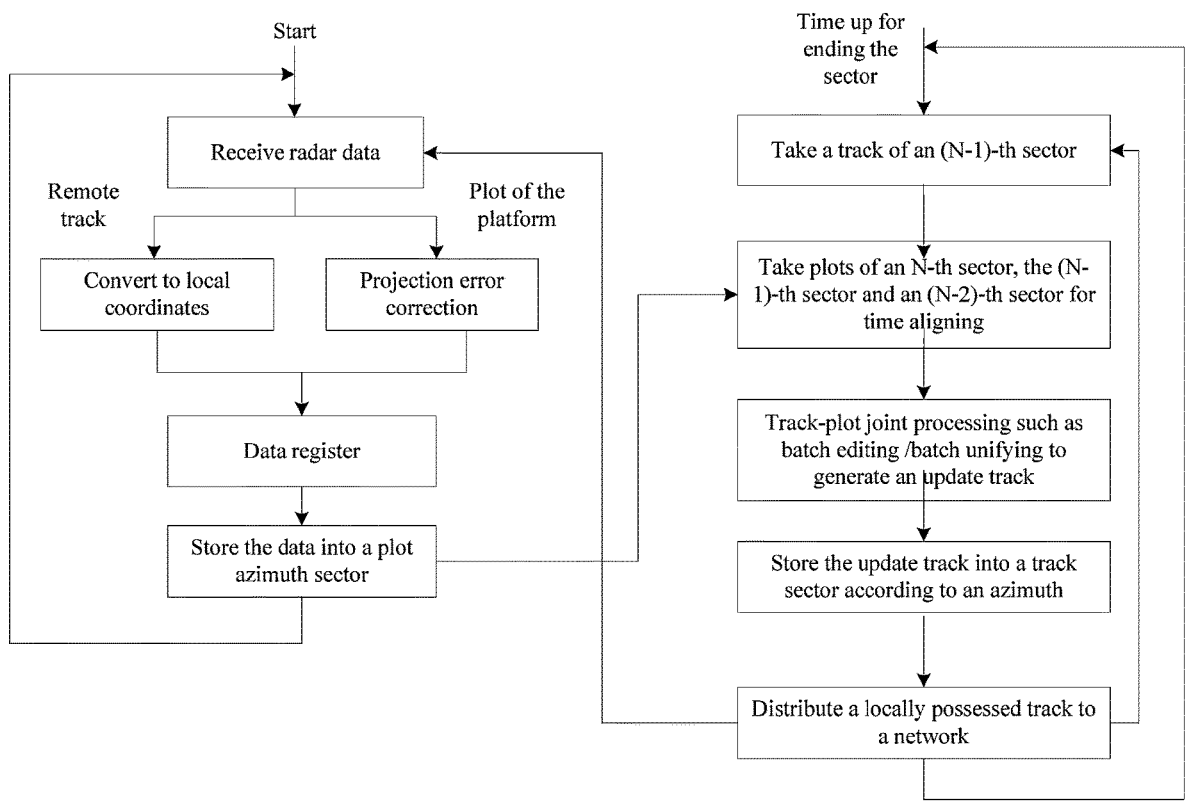
FIG. 4 is a flow chart of accurate grid locking of the CEP in the accurate grid locking method for the target composite tracking system in the terminal area provided by the embodiments of the present invention.

The flow chart of summarizing the above process as the accurate grid locking of the CEP is as shown in FIG. 4.

Compared with the existing distributed track fusion method, the accurate grid locking method for the target composite tracking system in the terminal area disclosed by the embodiments of the present invention supports distributed processing of radar plots, and the processing process is synchronized with radar scanning, which is beneficial to realizing high precision and low delay of composite track tracking, and satisfying the requirements of community accurate situation sharing and cooperative application. However, the existing distributed track fusion is only used for generating the CTP by the distributed processing of the target track (non-plot). Because the track information has isolated the radar to scan azimuths in real time, the processing process cannot be synchronized with radar scanning, so the existing distributed track fusion does not involve the accurate grid locking technology, and the accuracy and real-time performance of the CTP is lower than that of the SIP.

Compared with the existing centralized plot fusion method, the accurate grid locking method provided by the present invention accurately maps the targets discovered by the radar of another platform to the CEP plot storage area of the platform, and synchronously processes the targets with radar scanning, which can produce the same effect as tracking and locking targets of the platform, and supports cooperative actions in the terminal area. However, the existing centralized plot fusion is only suitable for converging multi-platform radar targets to the same central node for processing, and the centralized processing cannot be synchronized with radar scanning of each platform, so it is impossible to realize accurate grid locking, and it is impossible to produce an accurate target situation picture.

In specific implementation, the present invention also provides a computer storage medium, wherein the computer storage medium may store a program, and the program, when executed, may include part or all of the steps in each embodiment of the accurate grid locking method for the target composite tracking system in the terminal area provided by the present invention. The storage medium may be a magnetic disk, an optical disk, a Read-Only Memory (ROM) or a Random Access Memory (RAM), etc.

Those skilled in the art can clearly understand that the technology in the embodiments of the present invention can be realized by means of software plus necessary general hardware platform. Based on such understanding, the essence of the technical solutions in the embodiments of the present invention, or the part contributing to the prior art, may be embodied in the form of a software product. The computer software product may be stored in a storage medium such as an ROM/RAM, a magnetic disk, an optical disc and the like, comprising a number of instructions such that a computer device (which may be a personal computer, a server, or a network device, etc.) executes the methods described in various embodiments or some parts of the embodiments of the present invention.

The same and similar parts between the various embodiments in this specification may be referred to each other. The embodiments of the present invention described above do not limit the scope of protection of the present invention.

What is claimed is:

1. An accurate grid locking method for a target composite tracking system in a terminal area, which is characterized by performing accurate grid locking for a target composite tracking system composed of a cooperative engagement processer in each platform, comprising:

step 1: arranging a radar data storage structure through software design of the cooperative engagement processer, wherein the radar data storage structure comprises a plot data storage structure and a track data storage structure;

wherein the step1 further comprises:

dividing a coverage airspace of the radar into M azimuth sectors centering on the radar through the cooperative engagement processer, wherein M is a number of equal parts of 360°, and a sector angle of each azimuth sector is 360°/M; and establishing two types of radar data storage structures according to the azimuth sectors, wherein the two types of radar data storage structures are the plot data storage structure and the track data storage structure;

wherein, the plot data storage structure is corresponding to plot sectors and configured for storing the received target plot data, and the track data storage structure is corresponding to track sectors and configured for storing the track data obtained by the cooperative engagement processer by processing the target plot data;

ranges of the plot sectors and the track sectors are consistent, or the ranges of the plot sectors and the track sectors are offset by half of the azimuth sector; and the plot sectors are arranged in an order of plot detection time; and the track sectors are arranged according to an increasing order of track azimuth:

step 2: as a radar scans according to the azimuth, storing the target plot data received by the cooperative engagement processer in the corresponding radar data storage structure one by one;

step 3: when the radar finishes scanning each sector, processing target plot data of a previous sector to form a target track;

step 4: distributing the obtained target track to another platform on a data link; and step 5: receiving track data of a remote target distributed by another platform, inputting the track data into the plot data storage structure of the platform, and executing the step 3 wherein from the step 2 to 5 further comprises:

the coverage airspace of the radar on each platform is divided into M azimuth sectors, and the CEP of each platform establishes corresponding plot storage areas and track storage areas for 32 sectors, wherein the area number N=0, 1, 2, . . . , and M;

set any one of the platforms as platform A, as the radar scans, the CEP continuously receives the target plot data, performs the projection error correction and data register, and then consolidates the data into the plot file format, and stores the plot file format in the plot sector corresponding to the target azimuth; for example, if a target azimuth angle is a, the plot file format is stored in an custom-characterstorage area $$\left[\frac{\alpha}{M}\right],$$

the target plot data is stored in a time sequence;

when the radar scans an azimuth where an N-th sector ends, the CEP takes plots in {N,(N−1),(N−2)} sectors for time alignment processing, then takes tracks of an (N−1)-th sector and these plots for space-time unifying, batch number unifying and correlation solving to generate a target track update file, which is stored in the corresponding track storage area according to the target azimuth; when scanning an azimuth wherein next (N+1)-th section ends, the same processing is repeated for the (N+1)-th sector; as the radar scans, the processing goes through each sector, and goes round and round and iterates continuously to obtain a target motion track, wherein the target motion track is the track;

the CEPs of the four platforms perform the same operation in parallel, and convert the track information possessed respectively into longitude and latitude coordinates and send the longitude and latitude coordinates to CEPs of another platform in the network in real time, in coordinate conversion, a geographical coordinate reference point should be set as (0°,0°) to avoid additional target position errors due to coordinate conversion residuals caused by taking longitude and latitude of an aircraft as a reference;

after receiving trajectory information, all platforms process it simultaneously;

still taking the platform A as an example, the CEP receives the target track information of the remote radar, which is first displayed to ensure low delay, then converted to a coordinate system centered on the radar position of the platform A, then the remote data is registered, and inserted into the plot storage area of the CEP according to the target azimuth, for example, if the target azimuth is a, the data is inserted into the storage area, and when the radar of the platform scans the sector, the data is subjected to plot composite processing with the radar of the platform to ensure high accuracy; track information comprising "batch number, heading, speed and time" is reserved in the plot file for time aligning and batch number unifying;

the cooperative engagement processer of each platform executes the same program, which can accurately combine the independent radars of each platform into a "big radar", and solve the problem that members on the data link share the single integrated picture without a central node;

the remote radar target is transformed into the tracking effect of the platform, and even if the radar of the platform is in a silent state, that is, the radar of the platform only scans but does not radiate, the target can be locked and the target situation can be shared; and composite tracking processing is synchronized with the radar scanning of the platform, and the target tracking delay is minimal, which is beneficial to accurate control.

2. The accurate grid locking method for the target composite tracking system in the terminal area according to claim 1, wherein the step 2 comprises:

receiving, by the cooperative engagement processer, target plot data of the platform in real time;

taking a radar position obtained by a navigation system of the platform in real time as a coordinate center, which is, an origin of polar coordinates, performing projection error correction and data registration on the target; wherein, the projection error correction means converting a spatial position of the target plot data into error correction of a ground projection position, and the data registration means performing systematic error correction on the target plot data and track data of a remote target; and consolidating the received target plot data into a plot file format, and storing the plot file format in a plot sector corresponding to a target azimuth.

3. The accurate grid locking method for the target composite tracking system in the terminal area according to claim 1, wherein the step 3 comprises:

when the radar scans an azimuth where a sector ends, performing association processing, by the cooperative engagement processer, on target information in the previous sector and the target track in a track sector;

the target information comprising the received target plot data of the platform and the target plot data of the plot file format converted by the track data of the remote target obtained in the step 5; and the target track being track information generated by processing the target plot data of the previous sector; and the association processing comprising space-time unifying, batch number unifying and correlation solving;

wherein, the space-time unifying refers to a method of unifying clocks, unifying coordinate systems and unifying coordinate conversion of each platform; the batch number unifying refers to unifying a radar target identification number of each platform; and the correlation solving refers to associating the existing target track with the latest target plot data, generating a track update file and sending the track update file to a client system for target monitoring, and meanwhile, predicting a position of the target track in next cycle, and storing the target azimuth of the predicted position in the corresponding track sector to prepare for association processing between next scanning cycle and the target plot data; and with the 0° to 360° continuous scanning of the radar, the association processing goes through every sector continuously to form a single integrated picture for target tracking.

4. The accurate grid locking method for the target composite tracking system in the terminal area according to claim 1, wherein the step 4 comprises:

converting, by the cooperative engagement processer, a current position of the target track into geographic coordinates expressed by longitude and latitude to form a formatted message;

sending the formatted message to a cooperative engagement processer of another platform on the data link in real time through a data link transmission device; and in the process of converting the current position of the target track into the geographic coordinates expressed by latitude and longitude, setting an origin of the geographic coordinates as (0°,0°), which is used to avoid additional target position errors due to coordinate conversion residuals when taking the longitude and latitude of the platform as the origin.

5. The accurate grid locking method for the target composite tracking system in the terminal area according to claim 3, wherein the step 5 comprises:

step 5-1: when the cooperative engagement processer receives the track data of the remote target distributed by another platform, sending the track data of the remote target to a client system to display a single integrated picture to ensure a low delay;

step 5-2: converting to a coordinate system centered on a radar position of the platform, registering remote data, storing the remote data in the corresponding plot sector according to an azimuth of the remote target, and reserving track information in the stored plot file for space-time unifying, batch number unifying and correlation solving in the step 3; the reserved track information comprising batch number, heading, speed and time; and step 5-3: executing the operation of the step 3.

6. The accurate grid locking method for the target composite tracking system in the terminal area according to claim 3, wherein the target composite tracking system composed of the cooperative engagement processer in the platform comprises the cooperative engagement processer deployed on each platform, and distributed processing software and interface software corresponding to the cooperative engagement processer;

the cooperative engagement processer is a generic device, and the cooperative engagement processer interfaces with the radar of the platform for receiving the target plot data; the cooperative engagement processer interfaces with a data link transmission device for exchanging information with the cooperative engagement processer of another platform on the data link to obtain a remote track; and the cooperative engagement processer interfaces with a task system of the platform, and sends a generated composite track to a client system to display a single integrated picture; and a scale of the composite tracking system is related to task requirements; and when a data link transmission device is additionally installed on a relevant platform in advance, one cooperative engagement processer is deployed at the same time for organization and application temporarily according to the task requirements.

* * * * *